US012797789B2

(12) United States Patent
Shrivastava et al.

(10) Patent No.: US 12,797,789 B2
(45) Date of Patent: Nov. 17, 2026

(54) LOW TEMPERATURE ELECTROCHEMICAL SYSTEM FOR HYDROGEN PURIFICATION AND PRESSURIZATION

(71) Applicants: CUMMINS INC., Columbus, IN (US); HYDROGENICS CORPORATION, Mississauga (CA)

(72) Inventors: Udit N. Shrivastava, East York (CA); Arvind V. Harinath, Oakville (CA); Jennie Eastcott, Oakville (CA); Qing Ni, Mississauga (CA); Richard J. Ancimer, Toronto (CA); Frank van den Bosch, Toronto (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 948 days.

(21) Appl. No.: 18/065,318

(22) Filed: Dec. 13, 2022

(65) Prior Publication Data

US 2023/0191319 A1 Jun. 22, 2023

Related U.S. Application Data

(60) Provisional application No. 63/291,099, filed on Dec. 17, 2021.

(51) Int. Cl.

| | |
|---|---|
| ***B01D 53/32*** | (2006.01) |
| ***B01D 53/26*** | (2006.01) |
| ***B01D 53/30*** | (2006.01) |
| ***C01B 3/56*** | (2006.01) |
| ***H01M 8/04119*** | (2016.01) |
| ***H01M 8/0662*** | (2016.01) |

(52) U.S. Cl.

CPC ........... *B01D 53/326* (2013.01); *B01D 53/26* (2013.01); *B01D 53/30* (2013.01); *C01B 3/56* (2013.01); *H01M 8/04126* (2013.01); *H01M 8/0681* (2013.01)

(58) Field of Classification Search

CPC ...... B01D 53/326; B01D 53/26; B01D 53/30; B01D 2256/16; C01B 3/56; C01B 3/50; H01M 8/04126; H01M 8/0681

See application file for complete search history.

(56) References Cited

U.S. PATENT DOCUMENTS

| | | | |
|---|---|---|---|
| 6,168,705 B1 | 1/2001 | Molter et al. | |
| 7,628,842 B2 | 12/2009 | Schwartz et al. | |
| 9,707,509 B2 | 7/2017 | Deptala | |
| 10,892,507 B2 | 1/2021 | Jahnke et al. | |
| 2005/0265919 A1 | 12/2005 | Lomax et al. | |
| 2017/0054170 A1* | 2/2017 | Wakita | C01B 3/384 |
| 2019/0368483 A1* | 12/2019 | Wakita | C25B 9/05 |
| 2021/0387140 A1* | 12/2021 | Onuma | H01M 8/04201 |

FOREIGN PATENT DOCUMENTS

| | | |
|---|---|---|
| JP | 2012001380 | 1/2012 |
| JP | 4945158 | 6/2012 |
| JP | 6432842 | 12/2018 |

* cited by examiner

*Primary Examiner* — Bryan D. Ripa

(74) *Attorney, Agent, or Firm* — Barnes & Thornburg LLP

(57) ABSTRACT

The present disclosure generally relates to systems and methods of purifying hydrogen, comprising humidifying, oxygenating, and purifying an impure gas stream to produce hydrogen in an electrochemical pump stack. The purified hydrogen is segregated and dispelled from the electrochemical pump stack.

18 Claims, 7 Drawing Sheets

LOW TEMPERATURE ELECTROCHEMICAL SYSTEM FOR HYDROGEN PURIFICATION AND PRESSURIZATION

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/291,099 filed on Dec. 17, 2021, the entire disclosure of which is hereby expressly incorporated herein by reference.

TECHNICAL FIELD

The present disclosure generally relates to an electrochemical pump stack for purifying and pressurizing hydrogen.

BACKGROUND

Ultra-high purity of hydrogen is required for many applications including for microprocessors, LEDs, and fuel cell stacks. Fuel cell stacks may be utilized for different applications including portable applications, such as powering cars, trucks, or other industrial vehicles and equipment. Typical hydrogen production relies on the implementation of a steam methane reforming (SMR) process. Hydrogen produced through this SMR process contains undesirable gaseous impurities, such as sulfur oxides (SOx), hydrogen sulfide ($H_2S$), and carbon monoxide (CO). For example, the carbon monoxide level in the hydrogen produced from the SMR process is required to be below 1 ppm.

Increased hydrogen purity can be achieved by employing electrochemical hydrogen pump stacks. Electrochemical pumps are typically utilized in a series or in a parallel configuration with interconnecting structures to form an electrochemical pump stack. Such electrochemical pump stacks are utilized to produce pure hydrogen at useful voltages or currents. Each electrochemical pump stack separates pure hydrogen from impure hydrogen via electrochemically splitting hydrogen at an anode and recombining it at a cathode.

Low temperatures are desirable for operating such electrochemical pump stacks because the energy required for purification is minimized. Described herein are methods and systems comprising an electrochemical pump stack to separate and/or purify hydrogen from an affluent gas stream at low temperatures in the range of about 25° C. to about 90° C.

SUMMARY

Embodiments of the present invention are included to meet these and other needs. In one aspect, described herein, is a method of purifying hydrogen. The method comprises the steps of humidifying an impure gas stream to form a humidified impure gas stream, oxygenating the humidified impure gas stream to form an oxygenated humidified impure gas stream, electrochemically purifying the oxygenated humidified impure gas stream to form a hydrogen gas stream, purifying hydrogen by segregating purified hydrogen from other gases in the hydrogen gas stream to form a purified hydrogen stream, and dispelling the purified hydrogen stream. The method of purifying hydrogen at a temperature of about 25° C. to about 90° C. is implemented by a controller.

In some embodiments, humidifying the impure gas stream may comprise infusing the impure gas stream with about 20% to about 100% moisture or water.

In some embodiments, oxygenating the humidified impure gas stream may comprise determining an amount of oxygen in the humidified impure gas stream by utilizing an oxygen sensor. In some embodiments, the oxygen sensor may trigger an addition of oxygen upon a determination that the amount of oxygen in the humidified impure gas stream is less than about 1%. In some embodiments, the addition of oxygen may be done by an air pump.

In some embodiments, electrochemically purifying the oxygenated humidified impure gas stream may comprise processing the oxygenated humidified impure gas stream through an anode side of an electrochemical pump stack. In some embodiments, the electrochemical pump stack may be enclosed in a cooling jacket.

In some embodiments, the method may further comprise passing a recirculation hydrogen stream from an anode side of an electrochemical pump stack through a hydrogen pump. In some embodiments, the recirculation hydrogen stream may pass through a first solenoid or a second solenoid. If the recirculation hydrogen stream passes through the first solenoid, the recirculation hydrogen stream may combine with the oxygenated humidified impure gas stream. If the recirculation hydrogen stream passes through the second solenoid, the recirculation hydrogen stream may combine with the impure gas stream. In some embodiments, the controller may receive information from an oxygen sensor, a mass flow meter which measures gas mass, and an electrical system that includes a power source, a high frequency cell resistance measurement device, or a DC voltameter. The controller may control an air pump configured to add oxygen to the humidified impure gas stream, the first solenoid valve, and the second solenoid valve.

In some embodiments, segregating the purified hydrogen from the other gases may comprise measuring a concentration level of the hydrogen gas stream. In some embodiments, segregating the purified hydrogen may comprise feeding the hydrogen gas stream into a cathode side of an electrochemical pump stack if the hydrogen gas stream comprises a hydrogen concentration of about 98% or greater. In some embodiments, the method may further comprise compressing the purified hydrogen stream within the cathode side of the electrochemical pump stack.

In some embodiments, a portion of the hydrogen gas stream may be recirculated back to the humidifying step as a recirculation stream. In some embodiments, if the hydrogen concentration in the recirculation stream is less than about 98%, the hydrogen concentration may be changed by an addition of hydrogen through a hydrogen purge pump.

In some embodiments, the method may further comprise compressing the purified hydrogen stream before dispelling the purified hydrogen stream. In some embodiments, compressing the purified hydrogen stream may comprise forcing hydrogen into a confined volume of a cathode side of an electrochemical pump stack. In some embodiments, compressing the purified hydrogen stream may be done by an air compressor.

In some embodiments, the method may further comprise drying the purified hydrogen stream before dispelling the purified hydrogen stream. In some embodiments, drying the purified hydrogen stream may cease when the purified hydrogen stream has a moisture content of about 0% to about 5%.

In another aspect, described herein, is a system for purifying hydrogen. The system comprises a network of hoses and a controller. The network of hoses connects a humidifier and an air pump configured to add oxygen, a mixer configured to mix different air streams, an electrochemical pump stack comprising an anode side and a cathode side, and a mass flow meter, one or more sensors, and one or more solenoid valves. The one or more sensors comprise a humidity sensor to determine moisture in a first gas stream and an oxygen sensor to determine a percentage of oxygen in a second gas stream. The one or more solenoid valves are configured to direct a third gas stream through the humidifier. The controller is in communication with the air pump, the one or more sensors, the mass flow meter, and the one or more solenoid valves.

In some embodiments, the system may further comprise a nitrogen purge cylinder configured to purge air from the electrochemical pump stack.

These and other features, aspects, and advantages of the present disclosure will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

Figure 1A:
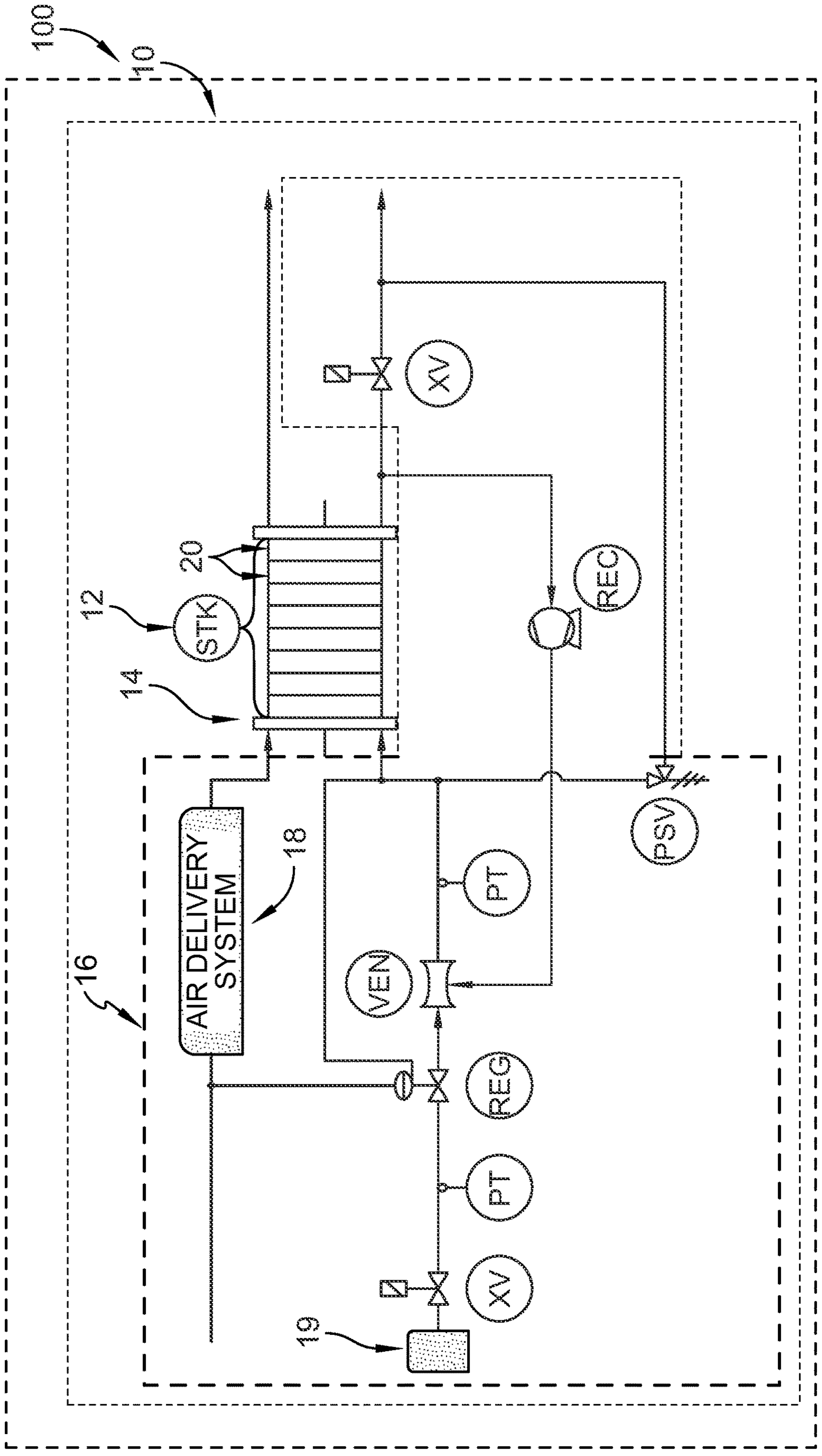
FIG. 1A is a schematic view of an exemplary fuel cell system including an air delivery system and a fuel cell module including a stack of multiple fuel cells.
Figure 1C:
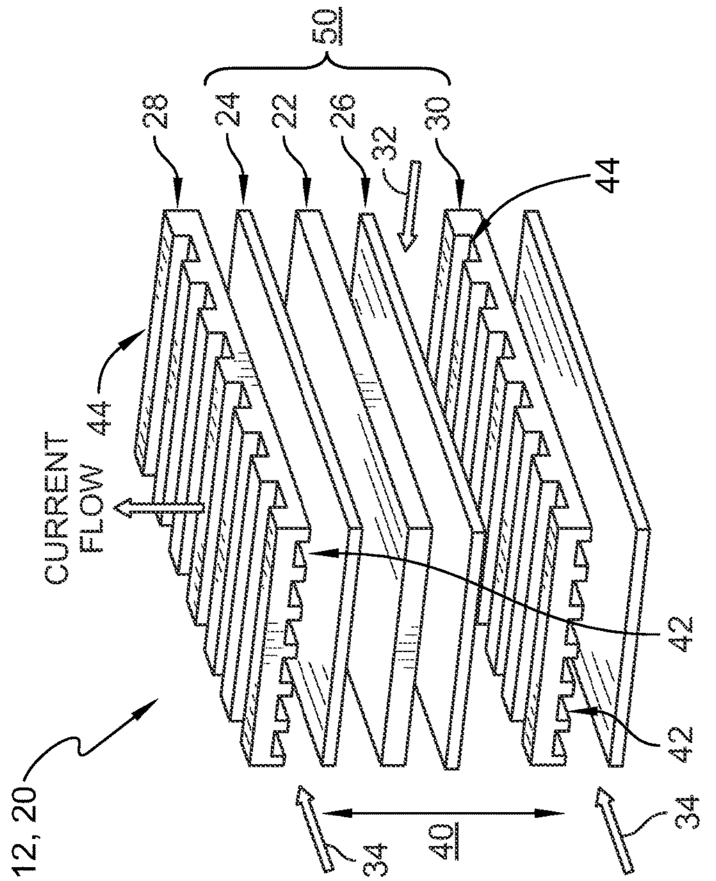
FIG. 1C is a perspective view of an exemplary repeating unit of a fuel cell stack of the fuel cell system of FIG. 1A.
Figure 1B:
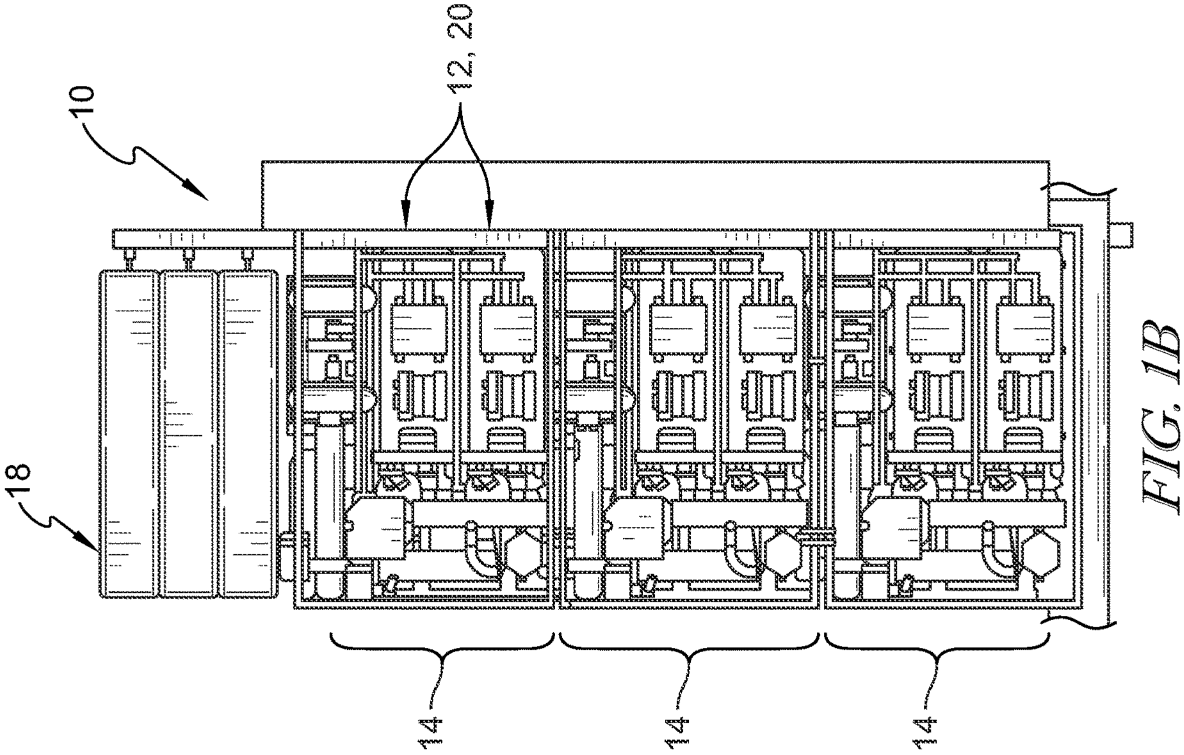
FIG. 1B is a cutaway view of an exemplary fuel cell system including an air delivery system and a plurality of fuel cell modules each including multiple fuel cell stacks.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
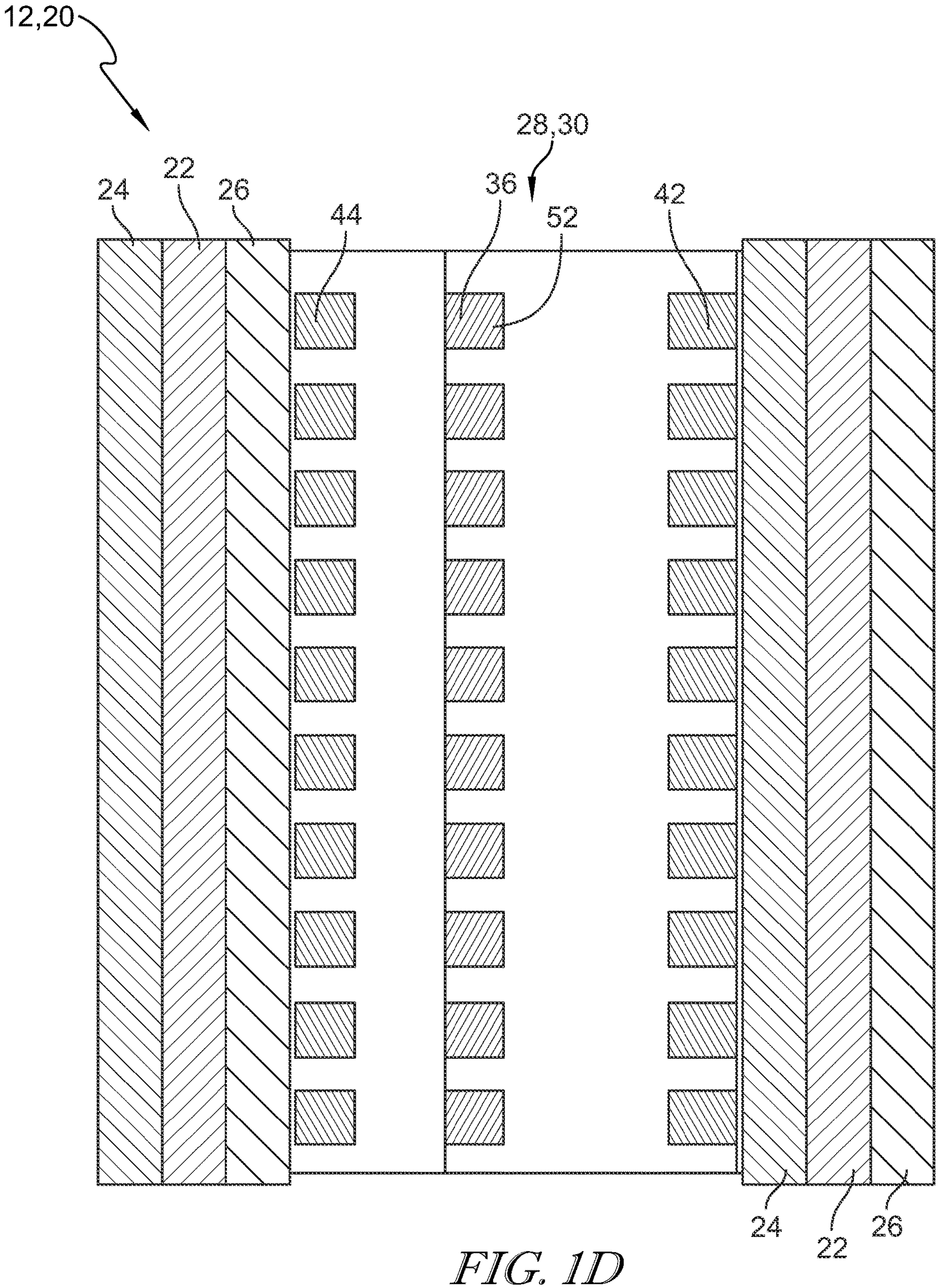
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24.

As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a source of hydrogen 19 such as a pressurized tank, including a gaseous pressurized tank, cryogenic liquid storage tank, chemical storage, physical storage, stationary storage, or electrolyzers. In one embodiment, the fuel cell system 10 is connected and/or attached in series or parallel to a source of hydrogen 19, such as one or more sources of hydrogen 19 in the BOP 16 (see FIG. 1A). In another embodiment, the fuel cell system 10 is not connected and/or attached in series or parallel to a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
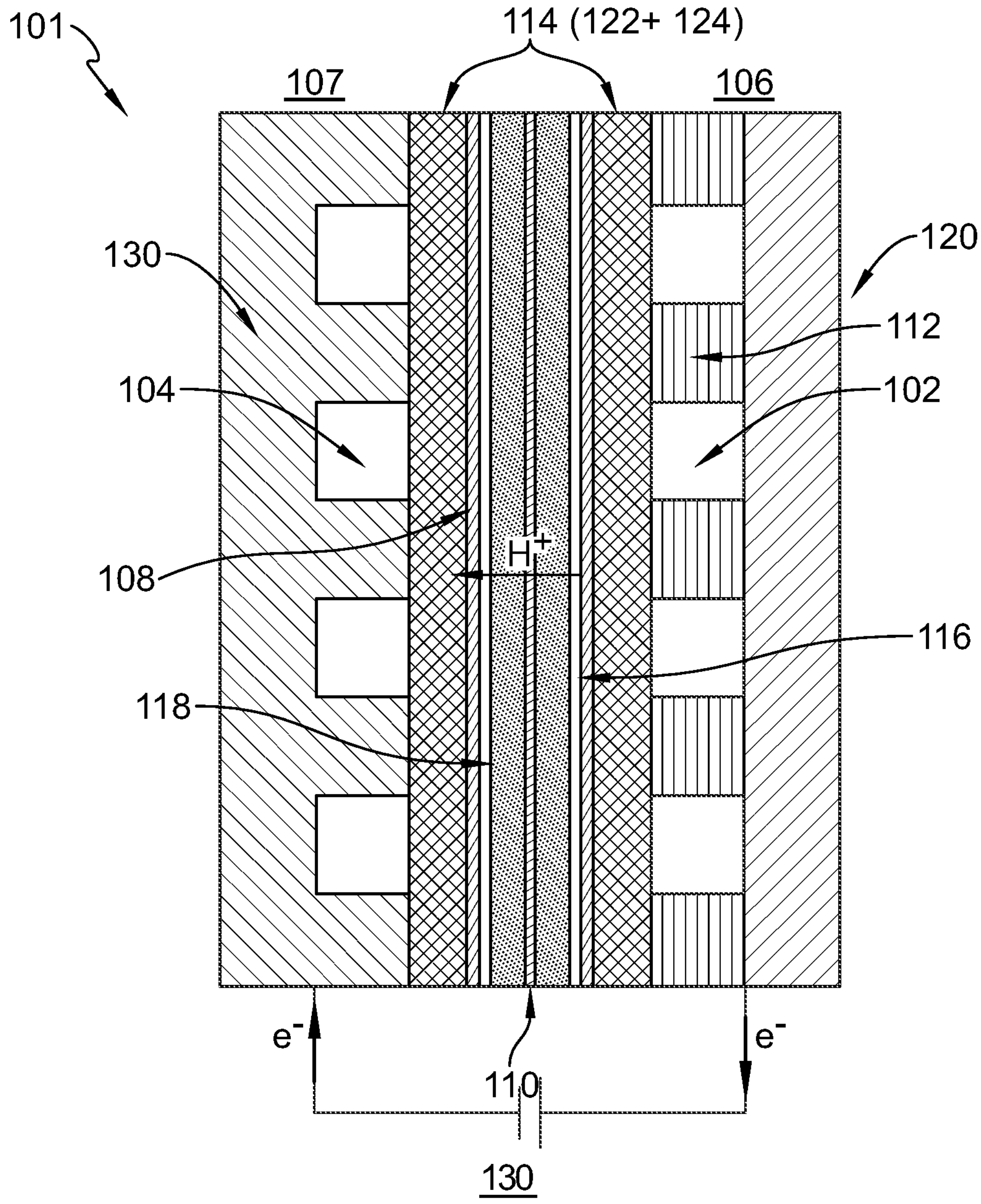
FIG. 2 is an illustration of an electrochemical pump in which hydrogen at an anode is separated from affluent containing gases, such as CO, $SO_x$, $CO_2$, etc., by a hydrogen pump electrochemical reaction.

An electrochemical pump unit 101 of the present disclosure is shown in FIG. 2. The electrochemical pump unit 101 is similar in structure to the fuel cell 20 described above. However, unlike the fuel cell 20, air is not supplied to the electrochemical pump 101 on the cathode 107 side.

Anode gas stream 102 enters the anode flow field 120 of the anode 106. The anode gas stream 102 may consists of $H_2$, CO, $CO_2$, and/or $SO_x$, mixed with oxygen from air. The oxygen may range from about 0% to about 3% of the anode gas stream 102, including any percentage or range comprised therein.

The anode gas stream 102 flows through a graphite or a metal bipolar plate 112 and diffuses through a porous transport layer 114 to an anode catalyst layer 116. The porous transport layer 114 may typically comprise carbon paper, metal felt, or metal foam. Alternatively or additionally, the porous transport layer 114 may comprise any other relevant material.

The anode catalyst layer 116 may include catalysts, such as platinum/carbon or platinum-ruthenium/carbon, coated with an acidic ionomer. In other embodiments, the anode catalyst layer 116 may include nickel or other non-precious metals. Ruthenium is typically utilized because it has a tolerance for carbon monoxide and prevents carbon monoxide from bonding to the platinum catalyst. There may not be any ruthenium loss if the anode catalyst layer 116 is used in the electrochemical pump unit 101 comprising a flow of pure hydrogen instead of a flow of hydrogen air. Pure hydrogen may comprise about 99% to about 100% hydrogen, including any percentage or range of percentages comprised therein.

Upon the application of electricity, one or more hydrogen oxidation reactions occur at the anode catalyst layer 116. The typical hydrogen oxidation reactions (1) cause the hydrogen ($H_2$) to split into protons and electrons at the anode catalyst layer 116. Due to the presence of oxygen ($O_2$), partially oxygenated species including but not limited to CO, SOx, and NOx may fully oxidize at the anode catalyst layer 116.

$$H_2=2H^++2e^- \quad (1)$$

Protons from the anode 106 pass through a proton exchange membrane 110, comprising perfluoro sulfonic acid (PFSA) or hydrocarbon ionomers, to the cathode 107. The anode catalyst layer 116 may be separated from a gas diffusion layer (GDL) 122 by a microporous layer (MPL) 124. The microporous layer (MPL) 124 and the gas diffusion layer (GDL) 122 combine to form a MPL-coated GDL layer or a porous transport layer 114.

The thickness of the proton exchange membrane 110 may range from about 15 microns to about 55 microns, including any specific or range of thickness comprised therein. For example the proton exchange layer may range from about 15 microns to about 25 microns, from about 25 microns to about 35 microns, from about 35 microns to about 45 microns, or from about 45 microns to about 55 microns, including any thickness size or range comprised therein.

Electrons may pass through a power source 130 and recombine at the cathode catalyst layer 118. Hydrogen 108 is produced during a hydrogen evolution reaction at the cathode catalyst layer 118 according to the following reaction (2).

$$2H^{+}+2e^{-}=H_2 \quad (2)$$

The cathode catalyst layer 118 may include catalysts such as platinum/carbon or platinum-ruthenium/carbon catalysts coated with acidic ionomers. In other embodiments, the cathode catalyst layer 118 may include catalysts similar to the anode catalyst layer 116. Hydrogen 108 produced at the cathode catalyst layer 118 may diffuse out of the cathode catalyst layer 118 into the cathode flow field 130 after passing through the MPL-coated GDL layer or porous transport layer 114 as a pure hydrogen stream 104. The cathode flow field 130 may be made of stainless-steel, graphite, and/or titanium. The proton exchange membrane 110 included in the electrochemical pump 101 may be configured or designed to be an active electrochemical separator.

Figure 3:
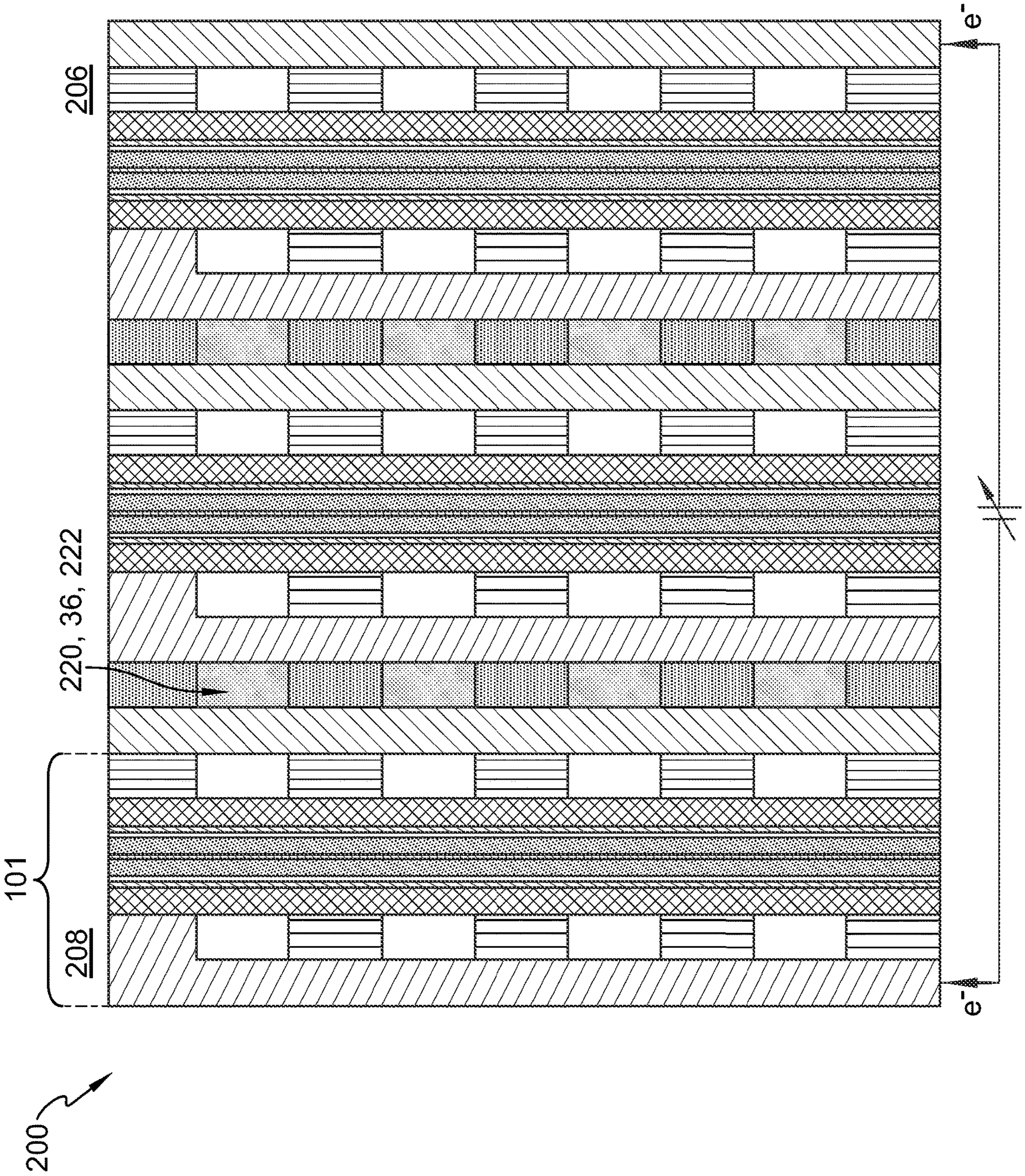
FIG. 3 is an illustration of an electrochemical pump assembly comprising more than one electrochemical pump.

As shown in FIG. 3, more than one electrochemical pump unit 101 may be combined to form an electrochemical pump stack 200. The electrochemical pump stack 200 may include about 2 to about 12 electrochemical pump unit 101, including and number of electrochemical pump units comprised therein. The electrochemical pump stack 200 includes a stack anode 206 and a stack cathode 208. Typically, the stack anode 206 and stack cathode 208 are defined by the outermost anode and cathode of the stack 200.

Flow channels 222 are created for coolant 36 flow between each electrochemical pump unit 101 in the electrochemical pump stack 200. The coolant 36 may be glycol. Alternatively, the coolant 36 may be water, glysantin, or combinations thereof.

Figure 4:
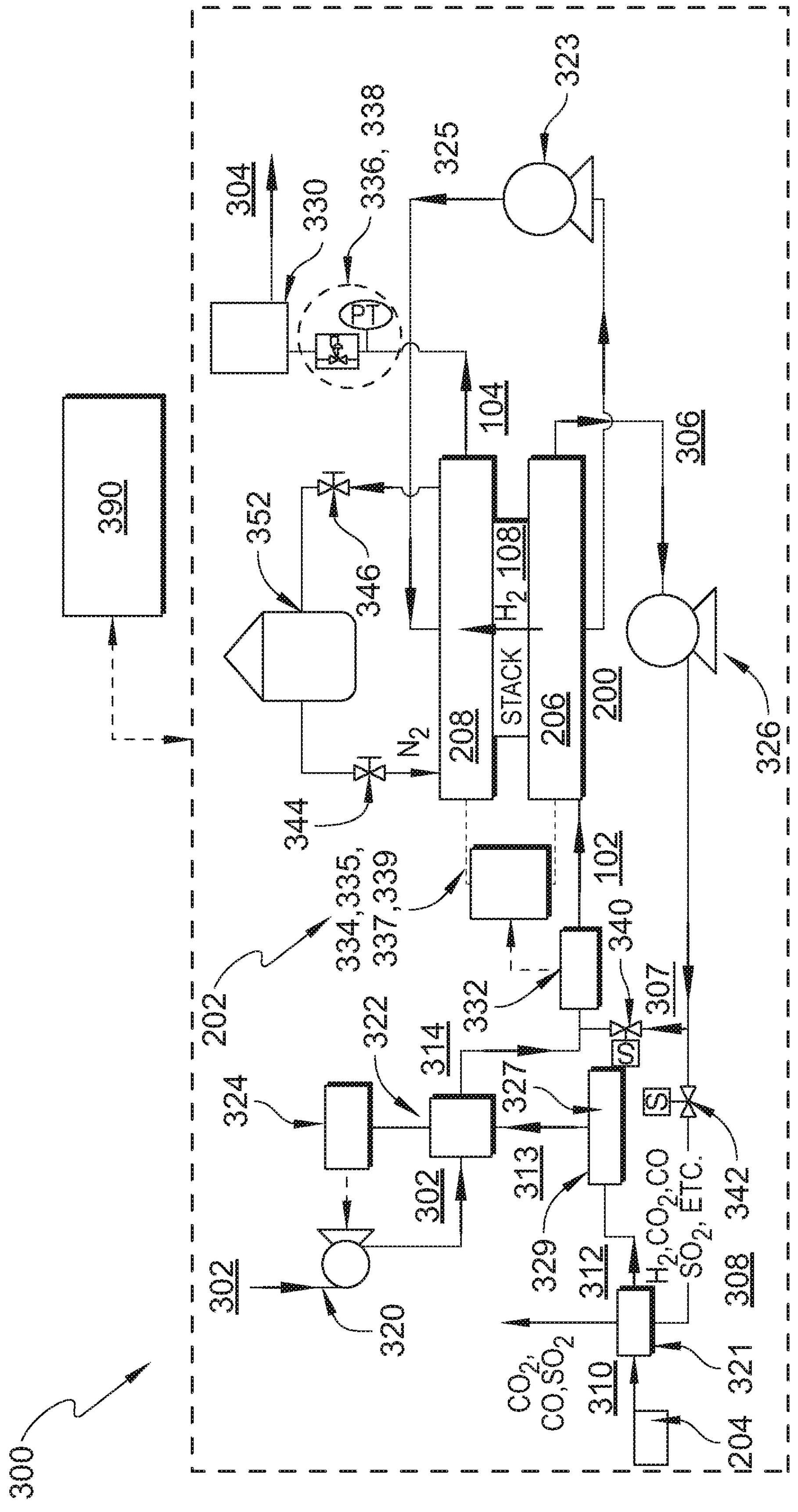
FIG. 4 is a schematic of an electrochemical pump system with a balance of plant.

As shown in FIG. 4, the electrochemical pump stack 200 may be integrated with the balance of plant 202 in an electrochemical pump system 300. Reformate gas stream 310 passes through a pressure swing adsorption (PSA) 321, which reduces the amount of carbon monoxide (CO) and sulfur monoxide (SO) to form an affluent stream 312. For example, the pressure swing adsorption (PSA) 321 may reduce the amount of CO in the downstream affluent stream 312 to an amount in a range of about 20 ppm to about 100 ppm, including any specific or range of amount comprised therein. For example, the amount of CO in the affluent stream 312 can range from about 20 ppm to about 40 ppm, about 40 ppm to about 80 ppm, about 80 ppm to about 100 ppm, including any amount or range comprised within those ranges.

The reformate gas stream 310 may be produced from a steam reforming methane processor 204 and may or may not include water. The affluent stream 312 is humidified in a humidifier 329 to form a humidified affluent stream 313. The humidified affluent stream 313 may be formed by infusing the affluent stream 312 with about 20% to about 100% moisture or water, including any specific or range of percentage comprised therein, as determined by a humidity sensor 327.

An oxygen sensor 324 measures the amount of oxygen in the humidified affluent stream 313 entering a mixer 322. Increased oxygen is useful for the reduction of carbon monoxide in the affluent stream 313. Oxygen may be introduced into the mixer 322, based on the oxygen sensor 324 measurements to ensure that oxygen content in the mixer 322 is about 0% to about 3% (e.g. a required level), including any percentage or range comprised therein. The oxygen sensor 324 may provide feedback to an air pump 320 to ensure that the oxygen content in the mixer 322 is at the required level.

Air (e.g., oxygen) from the environment 302 is pumped through the air pump 320, depending on the measurements made by the oxygen sensor 324, and is mixed with the humidified affluent stream 313 in the mixer 322 to form an oxygenated humidified affluent stream 314. The oxygenated humidified affluent stream 314 comprising about 0% to about 3% oxygen passes through a mass flow meter 332 which measures gas mass (e.g., hydrogen mass) and provides feedback to an electrical system 334. The oxygenated humidified affluent stream 314 enters the electrochemical pump stack 200 as the anode gas stream 102.

The anode gas stream 102 enters the electrochemical pump stack 200 at the stack anode 206. Hydrogen 108 is electrochemically produced during a hydrogen evolution reaction in the electrochemical pump stack 200. The hydrogen 108 is electrochemically pumped to the stack cathode 208. Based on the concentration of hydrogen 108 produced, the hydrogen 108 is directed into a pure hydrogen stream 104.

The amount of hydrogen 108 transported from the stack anode 206 to the stack cathode 208 is dependent on a current (I) as follows:

$$I = \frac{2M_{H_2}F}{\lambda M_{w,H_2}} \quad (3)$$

$M_{H_2}$ is a mass flow rate of hydrogen sensed by a mass flow meter 332. F is Faraday constant, $M_{w,H_2}$ is molecular weight of hydrogen, and λ is stoichiometry.

$$\lambda = \frac{M_{H_2}}{M_{H_2},\text{consumed}} \quad (4)$$

$M_{H_2}$, consumed is a mass transfer rate of hydrogen from stack anode 206 to the stack cathode 208.

The pure hydrogen stream 104 is compressed using a back pressure regulator 338 with a pressure transducer 336 and then dried by passing through a drier 330 to form a pressurized and purified hydrogen stream 304 (e.g., product gas stream). Thus, in some embodiments, the electrochemical pump 300 can simultaneously pressurize and purify hydrogen to form the purified hydrogen stream 304. Simultaneous pressurization and purification indicates that the pure hydrogen stream 104 and the purified hydrogen stream 304 are being formed at the same time.

In some embodiments, the pressurization and purification of pure hydrogen may not occur simultaneously. For example, hydrogen pressurization and purification may occur at different times (e.g., subsequently). Alternatively, the pure hydrogen stream 104 may be compressed by utilizing a different mechanism altogether.

The electrochemical pump stack 200 is cooled by a coolant pump 323. The coolant pump 323 uses a cooling liquid 325. The cooling liquid 325 may be water, glycol, combinations thereof, or a similar substance.

A recovery rate of hydrogen from the reformate gas stream 310 in the electrochemical pump system 300 is about 99% to about 100%. If 99.99% purity rate was recovered from the reformate gas stream 310 in a pressure based system comprising only the pressure swing adsorption (PSA) 321, the recovery rate may be about 80%. The hydrogen that is remaining in the electrochemical pump stack 200 ((λ−1) $M_{H_2}$) is recirculated as a recirculation stream 306 using a hydrogen recirculation pump 326.

Solenoid valves 340, 342 control the pathway for the recirculation stream 306. If the solenoid valve 340 is opened while the solenoid valve 342 remains closed, the recirculation stream 306 is directed as a first recirculated hydrogen stream 307 to mix with the oxygenated humidified affluent stream 314. The first recirculated hydrogen stream 307 mixes with the oxygenated humidified affluent stream 314 after the mixer 322 and before the mass flow meter 332.

If the solenoid valve 342 is opened while solenoid valve 340 remains closed, the recirculation stream 306 is pumped back into the pressure swing adsorption (PSA) 321 as a second recirculated hydrogen stream 308. Consequently, the second recirculated hydrogen stream 308 is mixed with reformate gas 310. A purity level of about 99% or higher indicates a high purity level of hydrogen. Recirculation of hydrogen as the recirculation stream 306 is critical to maintaining such high purity level of hydrogen in the hydrogen stream 304.

The electrical system 334 includes a power source 335 (e.g., a current and/or voltage source), a high frequency cell resistance measurement device 337, and/or a DC voltameter 339. The amount of power (P) consumed by the electrochemical pump stack 200 to pump hydrogen is a function of hydrogen mass flow, which determines the current (I) and resistance (R).

$$P=I^2R \tag{5}$$

A nitrogen purge cylinder 352 may be connected to the stack cathode 208 and the stack anode 206 to purge air originally present in the electrochemical pump 200 by using nitrogen. During the process of purging, purge valves 344, 346 may be configured to remain open. Any air present in the electrochemical pump 200 is required to be purged to prevent autocatalytic combustion. The purge valves 344, 346 are configured to be closed after purging. The hydrogen 108 formed in the electrochemical pump stack 200 is not designed or configured to pass through the nitrogen purge cylinder 352. Alternatively, the nitrogen purge cylinder 352 may be used to purge the electrochemical pump stack 200 when there is no hydrogen 108 in the stack cathode 208.

As shown in FIG. 3, the electrochemical pump 200 may be enclosed in a cooling jacket 220. The electrochemical pump 200 may be cooled by pumping coolant 36 or water into the cooling jacket 220.

The different components of the electrochemical pump system 300, the pressure swing adsorption (PSA) 321, the mixer 322, the air pump 320, the humidifier 329, the solenoid valves 340, 342, the hydrogen recirculation pump 326, the coolant pump 323, the drier 330, the nitrogen purge cylinder 352, purge valves 344, 346 the various sensors 324, the back pressure regulator 338 with the pressure transducer 336, and the electrochemical pump stack 200 are connected through a network of elements including but not limited to hoses, valves, switches, and levers and are controlled by a controller 390. The electrochemical pump stack 200 in the electrochemical pump system 300 may be a single stage electrochemical pump or a multistage electrochemical pump.

A method of purifying the reformate gas stream 310 may include the controller 390 determining the operation of different components of the electrochemical pump system 300. The method may include humidifying or adding moisture to the reformate gas stream 310, oxygenating the reformate gas stream 310 by adding air from the environment 302, and/or electrochemically purifying the anode air stream 102 to form the pressurized and purified hydrogen stream 304. The anode air stream 102 comprising the reformate gas stream 310 may be electrochemically purified at the stack anode 206 and the stack cathode 208 to form hydrogen 108, which may be removed from the electrochemical pump 200 as the purified hydrogen stream 304.

The method may include the controller 390 segregating and/or dispelling the pressurized and purified hydrogen stream 304 from the reformate gas stream 310. The method may include segregating hydrogen 108 from the stack anode 206 of the electrochemical pump stack 200 into the stack cathode 208 of the electrochemical pump stack 200, and dispelling some hydrogen 108 from the electrochemical pump stack 200 as pressurized and purified hydrogen stream 304.

The method may include the controller 390 compressing the hydrogen 108 by forcing the hydrogen 108 into a confined volume of the stack cathode 208. Alternatively, the method may include the controller 390 compressing the hydrogen 108 by passing the pure hydrogen stream 104 through the back pressure regulator 338 with the pressure transducer 336. The method may include purifying hydrogen at a temperature of about 25° C. to about 90° C. The fuel cell stack 200 and other components of the fuel cell system may be at a temperature of about 25° C. to about 90° C.

Stack 200 compression during an electrochemical process may be more efficient than using air compression because there is no change of entropy during stack 200 compression. The isotropic process during compression in an air compressor is thermodynamically less efficient than stack 200 compression during the electrochemical process. Furthermore, the electrochemical process is also an isothermal process and reduces the cost of purification.

The present method may include the controller 390 communicating with the pressure swing adsorption (PSA) 321, the oxygen sensor 324, the mixer 322, the recirculation pump 326 and/or the drier 330 to segregate the pressurized and purified hydrogen stream 304 from other gases in the reformate gas stream 310. This is based on the hydrogen concentration in the anode air stream 102, the reformate gas stream 310, and/or the purged hydrogen stream 307.

The method may include the controller 390 determining the recirculation of a portion of hydrogen 108 as the recirculation stream 306 through the recirculation pump 326 to form the purged hydrogen stream 307. The method may include the controller 390 drying the pure hydrogen stream 104 by passing it through a drier 330. In some embodiments, drying the pure hydrogen stream 104 may be ceased after a predetermined time or when the moisture content of the pure hydrogen stream 104 is about 0% to about 5%, including any specific or range of percentages comprised therein.

The method may include the controller 390 adding oxygen to the humidified affluent stream 313 if the oxygen sensor 324 determined that the humidified affluent stream 313 comprises less than about 1% oxygen (e.g., 0% to about 1% oxygen). In some embodiments, oxygen may be added to the humidified affluent stream 313 through the air pump 320.

Figure 5:
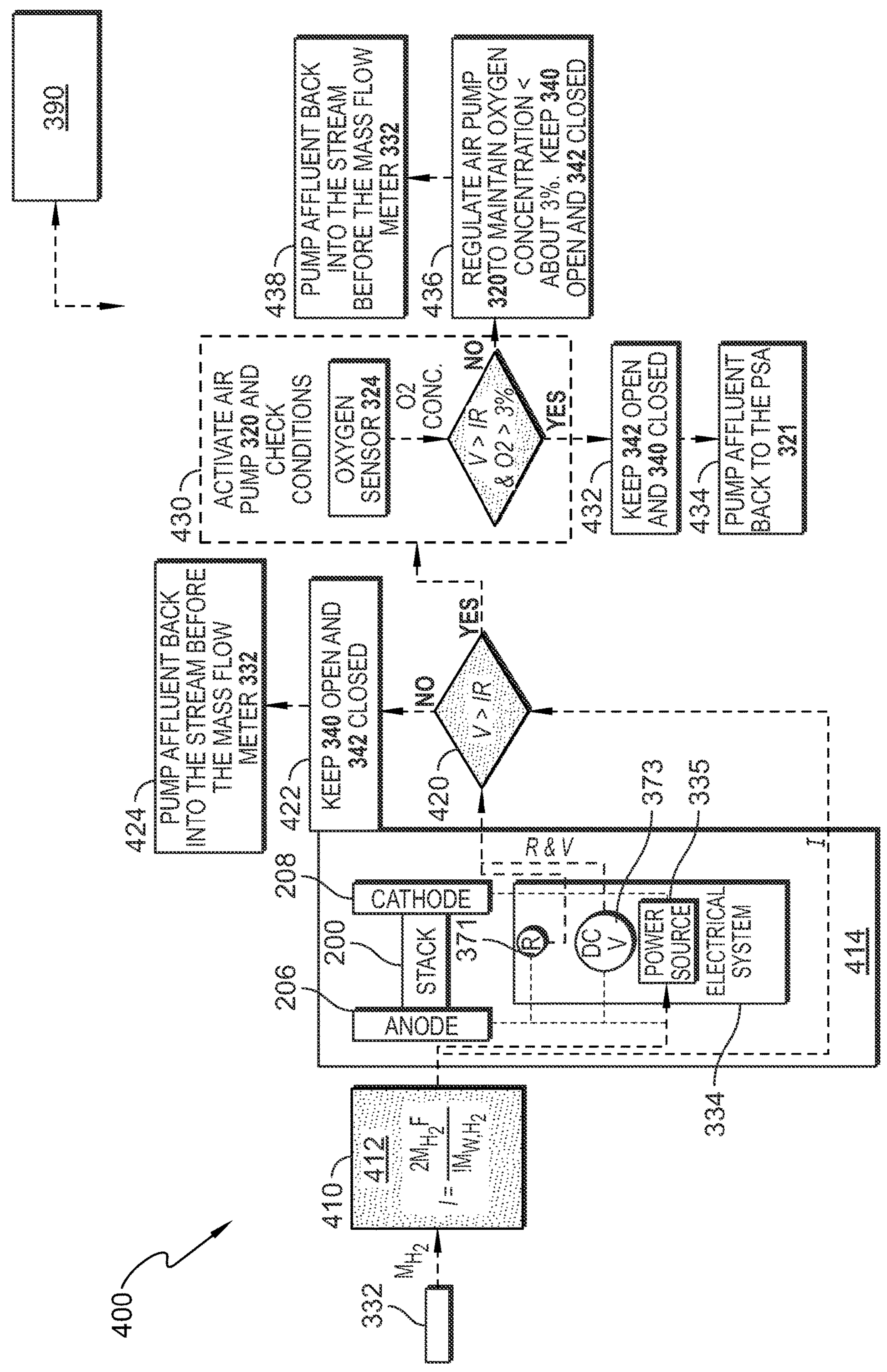
FIG. 5 shows a control system logic that is implemented by a controller to operate an electrochemical pump system.

FIG. 5 shows one embodiment of control system logic 400 that is implemented by the controller 390 to operate the electrochemical pump system 300. The controller 390 receives information from different components of the electrochemical pump system 300 including the electrical system 334, the mass flow meter 332, and the oxygen sensor 324. As described previously, controller 390 controls different components of the electrochemical pump system 300 including the solenoid valves 340, 342, and the air pump 320. The electrical system 334 is also in communication with the mass flow meter 332. The controller 390 may instantaneously or in real time control the activity of the solenoid valves 340, 342, and the air pump 320 based on its communication with the electrical system 334, the mass flow meter 332, and the oxygen sensor 324.

In step 410, the current (I) is calculated based on the hydrogen mass flowing through the mass flow meter 332. A current calculator 412 discerns the hydrogen mass from mass flow meter 332 and converts it to current using Equation (3). In step 414, the output of the current calculator 412, a value of current (I) is fed to a power source 335 in the electrical system 334 which uses it as an input to apply power to the electrochemical pump 200. An AC ohmmeter 371 is utilized to measure Resistance (R) in the electrical system 334. A voltammeter 373 is utilized to measure DC voltage (V) in the electrical system 334.

In step 420, current (I), resistance (R), and voltage (V) values are input and evaluated by the control system 390. If the voltage (V) is not greater than the product of current and resistance (IR), the air pump 320 remains idle, the solenoid valve 340 is kept open, and the solenoid valve 342 is closed in step 422. Thus, the remaining amount of hydrogen is recirculated back into stream right before the mass flow meter 332 via the first recirculated hydrogen stream 307 in step 424.

If voltage (V) is greater than IR, step 430 is executed. The air pump 320 is activated and the oxygen content is increased up to a concentration which makes the V>IR condition false. This is executed based on communication with the oxygen sensor 324. When the oxygen concentration does not exceed about 3%, the air pump 320 is regulated to maintain an oxygen concentration in step 436, the solenoid valve 340 is opened, and the solenoid valve 342 is closed.

In step 438, the recirculation stream 306 is recirculated back into the fuel cell stack 12 by joining the oxygenated humidified affluent stream 314 right before the mass flow meter 332 via the first recirculated hydrogen stream 307. If the oxygen concentration exceeds about 3% and the V>IR condition still persists, then step 432 is executed. The solenoid valve 340 is closed and the solenoid valve 342 is opened. In step 434, the second recirculated hydrogen stream 308 is directed towards the pressure swing adsorption (PSA) 321 and mixed with the reformate gas stream 310.

The controller 390 may be implemented, in communication with hardware, firmware, software, or any combination thereof present on or outside the electrochemical pump system 300 comprising the electrochemical pump stack 200. Information may be transferred to the one or more controllers using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The controller 390 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device may include an input/output (I/O) subsystem, a memory, a processor, a data storage device, a communication subsystem, a controller, and a display. The computing device may include additional and/or alternative components, such as those commonly found in a computer (e.g., various input/output devices), in other embodiments. In other embodiments, one or more of the illustrative components may be incorporated in, or otherwise form a portion of, another component. For example, the memory, or portions thereof, may be incorporated in the processor.

The following described aspects of the present invention are contemplated and non-limiting:

A first aspect of the present invention relates to a method of purifying hydrogen. The method comprises the steps of humidifying an impure gas stream to form a humidified impure gas stream, oxygenating the humidified impure gas stream to form an oxygenated humidified impure gas stream, electrochemically purifying the oxygenated humidified impure gas stream for form a hydrogen gas stream, purifying hydrogen by segregating purified hydrogen from other gases in the hydrogen gas stream to form a purified hydrogen stream, and dispelling the purified hydrogen stream. The method of purifying hydrogen is implemented at a temperature of about 25° C. to about 90° C. by a controller.

A second aspect of the present invention relates to a system for purifying hydrogen. The system comprises a network of hoses and a controller. The network of hoses connects a humidifier and an air pump configured to add oxygen, a mixer configured to mix different air streams, an electrochemical pump stack comprising an anode side and a cathode side, and a mass flow meter, one or more sensors, and one or more solenoid valves. The one or more sensors comprise a humidity sensor to determine moisture in a first gas stream and an oxygen sensor to determine a percentage of oxygen in a second gas stream. The one or more solenoid valves are configured to direct a third gas stream through the humidifier. The controller is in communication with the air pump, the one or more sensors, the mass flow meter, and the one or more solenoid valves.

In the first aspect of the present invention, humidifying the impure gas stream may comprise infusing the impure gas stream with about 20 to about 100% moisture or water.

In the first aspect of the present invention, oxygenating the humidified impure gas stream may comprise determining an amount of oxygen in the humidified impure gas stream by utilizing an oxygen sensor. In the first aspect of the present invention, the oxygen sensor may trigger an addition of oxygen upon a determination that the amount of oxygen in the humidified impure gas stream is less than about 1%. In the first aspect of the present invention, the addition of oxygen may be done by an air pump.

In the first aspect of the present invention, electrochemically purifying the oxygenated humidified impure gas stream may comprise processing the oxygenated humidified impure gas stream through an anode side of an electrochemical pump stack. In the first aspect of the present invention, the electrochemical pump stack may be enclosed in a cooling jacket.

In the first aspect of the present invention, the method may further comprise passing a recirculation hydrogen stream from an anode side of an electrochemical pump stack through a hydrogen pump. In the first aspect of the present invention, the recirculation hydrogen stream may pass through a first solenoid or a second solenoid. If the recirculation hydrogen stream passes through the first solenoid, the recirculation hydrogen stream may combine with the oxygenated humidified impure gas stream. If the recirculation hydrogen stream passes through the second solenoid, the recirculation hydrogen stream may combine with the impure gas stream. In the first aspect of the present invention, the controller may receive information from an oxygen sensor, a mass flow meter which measures gas mass, and an electrical system that includes a power source, a high frequency cell resistance measurement device, or a DC voltameter. The controller may control an air pump configured to add oxygen to the humidified impure gas stream, the first solenoid valve, and the second solenoid valve.

In the first aspect of the present invention, segregating the purified hydrogen from the other gases may comprise measuring a concentration level of the hydrogen gas stream. In the first aspect of the present invention, segregating the purified hydrogen may comprise feeding the hydrogen gas stream into a cathode side of an electrochemical pump stack if the hydrogen gas stream comprises a hydrogen concentration of about 98% or greater. In the first aspect of the present invention, the method may further comprise compressing the purified hydrogen stream within the cathode side of the electrochemical pump stack.

In the first aspect of the present invention, a portion of the hydrogen gas stream may be recirculated back to the humidifying step as a recirculation stream. In the first aspect of the present invention, if the hydrogen concentration in the recirculation stream is less than about 98%, the hydrogen concentration may be changed by an addition of hydrogen through a hydrogen purge pump.

In the first aspect of the present invention, the method may further comprise compressing the purified hydrogen stream before dispelling the purified hydrogen stream. In the first aspect of the present invention, compressing the purified hydrogen stream may comprise forcing hydrogen into a confined volume of a cathode side of an electrochemical pump stack. In the first aspect of the present invention, compressing the purified hydrogen stream may be done by an air compressor.

In the first aspect of the present invention, the method may further comprise drying the purified hydrogen stream before dispelling the purified hydrogen stream. In the first aspect of the present invention, drying the purified hydrogen stream may cease when the purified hydrogen stream has a moisture content of about 0% to about 5%.

In the second aspect of the present invention, the system may further comprise a nitrogen purge cylinder configured to purge air from the electrochemical pump stack.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of purifying hydrogen, the method comprising the steps of:

humidifying an impure gas stream to form a humidified impure gas stream;

oxygenating the humidified impure gas stream to form an oxygenated humidified impure gas stream;

electrochemically purifying the oxygenated humidified impure gas stream by segregating purified hydrogen from other gases in the oxygenated humidified impure gas stream to form a purified hydrogen stream;

dispelling the purified hydrogen stream; and passing a recirculation hydrogen stream from an anode side of an electrochemical pump stack through a hydrogen pump, wherein the recirculation hydrogen stream passes through a first solenoid valve or a second solenoid valve, and wherein, if the recirculation hydrogen stream passes through the first solenoid valve, the recirculation hydrogen stream combines with the oxygenated humidified impure gas stream, and if the recirculation hydrogen stream passes through the second solenoid valve, the recirculation hydrogen stream combines with the impure gas stream;

wherein the step of electrochemically purifying the oxygenated humidified impure gas stream is implemented at a temperature of about 25° C. to about 90° C. by a controller.

2. The method of claim 1, wherein humidifying the impure gas stream comprises infusing the impure gas stream with moisture to provide a humidity in the range of about 20% to about 100%.

3. The method of claim 1, wherein oxygenating the humidified impure gas stream comprises determining an amount of oxygen in the humidified impure gas stream by utilizing an oxygen sensor.

4. The method of claim 3, further comprising providing feedback to an air pump from the oxygen sensor.

5. The method of claim 1, wherein electrochemically purifying the oxygenated humidified impure gas stream comprises processing the oxygenated humidified impure gas stream though the anode side of the electrochemical pump stack.

6. The method of claim 5, wherein the electrochemical pump stack is enclosed in a cooling jacket.

7. The method of claim 1, wherein the controller receives information from an oxygen sensor, a mass flow meter which measures gas mass, and an electrical system that includes a power source, a high frequency cell resistance measurement device, or a DC voltameter, and wherein the controller controls an air pump configured to add oxygen to the humidified impure gas stream, the first solenoid valve, and the second solenoid valve.

8. The method of claim 1, wherein segregating the purified hydrogen from the other gases comprises measuring a concentration level of the purified hydrogen.

9. The method of claim 8, wherein segregating the purified hydrogen comprises feeding the purified hydrogen into a cathode side of the electrochemical pump stack if the purified hydrogen comprises a hydrogen concentration of about 98% or greater.

10. The method of claim 9, further comprising compressing the purified hydrogen stream within the cathode side of the electrochemical pump stack.

11. The method of claim 1, further comprising compressing the purified hydrogen stream before dispelling the purified hydrogen stream.

12. The method of claim 11, wherein compressing the purified hydrogen stream comprises forcing hydrogen into a confined volume of a cathode side of the electrochemical pump stack.

13. The method of claim 1, further comprising drying the purified hydrogen stream before dispelling the purified hydrogen stream.

14. The method of claim 13, wherein drying the purified hydrogen stream ceases when the purified hydrogen stream has a moisture content of about 0% to about 5%.

15. The method of claim 1, further comprising passing a reformate gas stream through a pressure swing adsorption to form the impure gas stream.

16. The method of claim 1, wherein the step of oxygenating includes passing the humidified impure gas stream through a mixer.

17. The method of claim 1, further comprising passing the oxygenated humidified impure gas stream through a mass flow meter prior to the step of electrochemically purifying the oxygenated humidified impure gas stream.

18. The method of claim 1, further comprising purging air in the electrochemical pump stack.

* * * * *